United States Patent
Hsian

[15] 3,635,101
[45] Jan. 18, 1972

[54] AUTOMOBILE SPEED LIMITERS

[72] Inventor: Chun-Chih Hsian, 2 Lane, 60, Tai-shun Street, Taipei, Taiwan

[22] Filed: Feb. 6, 1969

[21] Appl. No.: 798,271

Related U.S. Application Data

[63] Continuation-in-part of Ser. No. 541,909, Mar. 22, 1966, abandoned.

[52] U.S. Cl....................................................74/526, 180/110
[51] Int. Cl............................................................B60k 31/00
[58] Field of Search...........................................180/105–110; 74/526; 192/3 T; 340/52, 62, 263

[56] References Cited

UNITED STATES PATENTS

| | | |
|---|---|---|
| 2,045,001 | 6/1936 | Smith........................74/526 X |
| 3,513,712 | 7/1950 | Coombs.....................180/106 X |
| 2,685,048 | 7/1954 | Schweitzer................340/62 X |
| 2,776,581 | 1/1957 | Hamlin.....................74/526 |
| 2,895,346 | 7/1959 | Arch..........................74/526 |
| 2,914,960 | 12/1959 | Edgerton..................180/106 X |
| 3,023,634 | 3/1962 | Tozza........................74/526 |
| 3,293,937 | 12/1966 | Gardner....................74/526 |

*Primary Examiner*—Kenneth H. Betts

[57] ABSTRACT

A speed-limiting device in which an accelerator stoppage is connected to a rack. The rack can move a pinion an amount that is adjustable by a lever in order to provide speed settings.

1 Claims, 5 Drawing Figures

3,635,101

*INVENTOR.*
HSIAN, CHUN-CHIH

INVENTOR.
HSIAN, CHUN-CHIH

AUTOMOBILE SPEED LIMITERS

This application is a continuation-in-part of Ser. No. 541,909 filed Mar. 22, 1966, now abandoned.

The present invention relates to means for adjustably limiting the speed of an engine by means of mounting an accelerator stoppage, and more particularly means for adjustably limiting the speed of an automobile.

The desirability of providing an automobile with some means for adjustably limiting its speed is acknowledged. Even well-intentioned drivers unconsciously exceed established speed limits. Consequently, many devices have been provided for this purpose. None of these devices has met with public approval, however, and automobiles continue to operate without some form of speed limiting control. The acceptability of these prior art devices appears to stem from a number of factors, the weightiest of these being expense, difficulty of installation, and ineffectiveness.

Accordingly, it is an object of the present invention to provide a speed limiting means for motor-driven vehicles which is relatively quite inexpensive, which may be easily installed without alteration in essentially all automobile types, and which may offer a satisfactory effectiveness in speed-limit. In addition to the above factors, acceptable speed settings are to be provided as driving conditions and speed limits vary. Furthermore, the device should be capable of instantly responding without adjustment when unusual situations arise which require speed (or power) beyond that of the then device setting. Such situations include, for example, gaining a hill, passing an automobile, or emergencies.

Accordingly, it is an another object of the present invention to provide a speed limiting device which, despite its inexpensiveness and installation simplicity, is readily adjustable and instantly responsive without adjustment to unusual situations.

An apparatus illustrating certain aspect of the invention may comprise an accelerator stoppage located adjacent the accelerator pedal utilized to control engine speed, means for adjusting the position of the accelerator stoppage and means for holding the said stoppage in a selected position.

A complete understanding of the invention may be obtained from the following detailed description of means forming a specific embodiment thereof, when read in conjunction with the appended drawing, in which.

Figure 3:
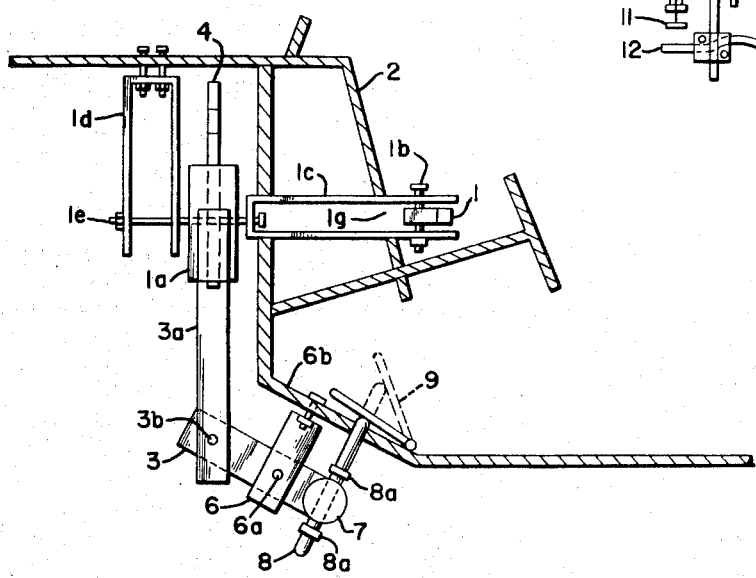
FIG. 3 is a side view of the automobile speed governor type A.

Referring to FIG. 3, rack 4 and climbing tail 3a of the linkage are welded as an integral body, and the tail is connected to the linkage 3 by means of an axle 3b. The suspending mount 6 located at the center of the linkage 3 is pinned by an axle 6a, and the suspending mount 6 is fastened to the floor board 6b. of the vehicle 5.

Figure 1:
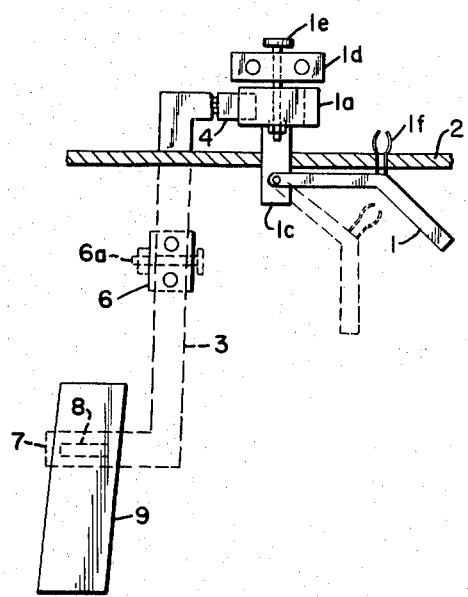
FIG. 1 is a plan view of the automobile speed governor type A.

Linkage 3 has a bent head 7 (refer to FIGS. 1 and 2) on which there are located two drill holes into which the accelerator stoppage 8 (in fact, it is small U-form upside-down screw-tube in which spring and warning light plug 10 are installed) is inserted, and is fastened by screwcaps 8a.

The climbing tail 3a of the linkage and the axle 3b, by lever action, will go up, and the bent head 7 and the accelerator stoppage 8 will go down while the gear scale 4 goes up. Because the accelerator stoppage 8 operates in the whole path of the accelerator pedal 9, consequently, the driver will never advance the pedal any more while the accelerator stoppage goes up to its highest position so that the automobile is deadly stopped. HOwever when the accelerator stoppage 8 goes down to floor board, the driver will be able to advance the pedal to its lowest position, at that event, he will drive his automobile at the maximum rate of speed. If the accelerator stoppage 8 locates at the center of the whole path of the accelerator pedal, however, the automobile will keep moving at the middle rate of speed. By keeping the accelerator stoppage 8 going up and down, we may thereby limit the speed of engine and control the speed of the automobile.

The turning of the gear 1a will cause the rack 4 to go up and down (refer to FIG. 2) due to both being meshed with each other, and the control lever mount 1c welded to a side of the gear 1a, will bring the gear's turning (refer to FIG. 3).

The gear 1a is supported by a horizontal axle 1e which penetrates the centers of the control lever mount 1c and gear 1a. The horizontal axle 1e is fixed to a side of the gear mount 1d, and the gear mount 1d is fastened to the instrument panel or to proper position.

The control lever mount 1c is installed in the hole 1g located at the proper position of both instrument panel 2 and front wall. The head of the control lever 1 is inserted between the two arms of 1c, and combines them with the vertical axle 1b. Thus, if we rotate the control lever 1 certain degrees, the control lever mount 1c will also rotate certain degrees correspondingly (refer to FIGS 1 and 2) resulting in the rack 4 going up and down, and thereby moving the accelerator stoppage 8 up and down simultaneously.

Let it first be assumed that we drill a hole at the 6 o'clock position of the clock, and that this hole is a corresponding mileage of 45 km. We again assume that we drill another hole at 9 o'clock position of the clock, and that this hole is a corresponding mileage of 65 km. (the same with others). Thus, the automobile is limited within the speed of any mileage desired if we insert the spring hamper 1f into any one of the mileage holes desired (refer to FIG. 1). The method by which the driver the present invention is: pull the spring hamper 1f out of a hole and insert it into another hole desired. Accordingly, to what degree the control lever 1 turns will decide the automobile's speeds. What I mentioned above is a principle of manufacturing the speed control meter 2, but the holes for the fixing of which must be adaptable to the various type of vehicles of different countries in accordance with their respective speed limit regulations and the meter must be also subject to actual experiment for accuracy.

Figure 2:
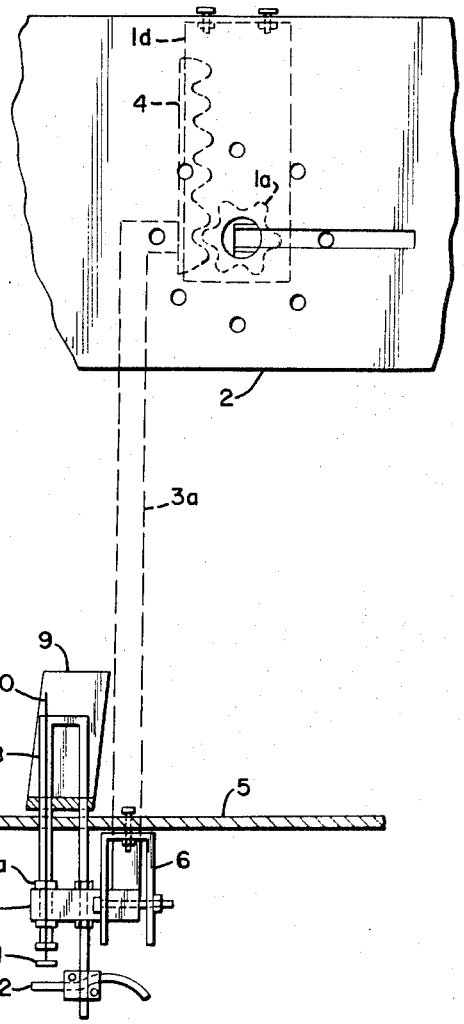
FIG. 2 is a rear view of the automobile speed governor type A mounted on an automobile.

As the accelerator pedal 9 is pedaled down without getting contact with accelerator stoppage 8, it first presses the higher end of warning light's plug 10 (bell) located in the accelerator stoppage 8 (refer to FIG. 2). This will keep the lower end of the plug 11 in contact with the warning lights (bell) socket 12, thereby transmitting electricity to illuminate lights (or sound bell which was not shown), as preset in an appropriate position near the driver's seat and at the rear of the vehicle to warn any following vehicles.

Figure 4:
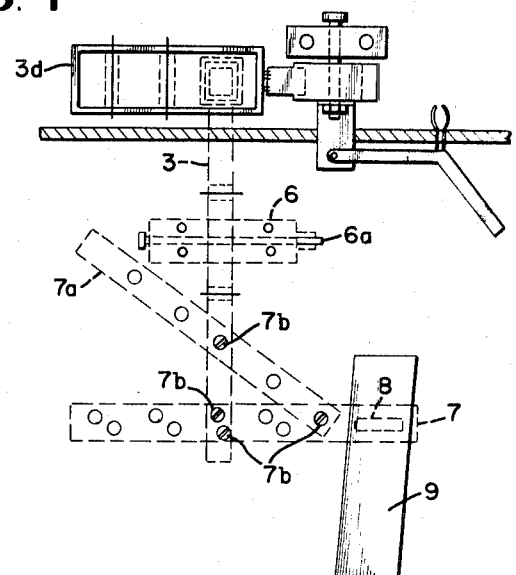
FIG. 4 is a plan view of the automobile speed governor type B.

Additionally, if we disassemble the bent head 7 of linkage to the status shown in FIG. 4 an by using a slant material 7a combine it with the linkage body 3 as an integral body, it will energize. By loosing the screw 7b securing the integral body and moving the head of linkage toward right or left for ensurably aligning the accelerator stoppage 8 directly beneath the pedal 9 to precisely receive the pressure from pedaling and then securing the screws. This device is completely adaptable to any type of various automobiles, large or small, of currently being used.

Figure 5:
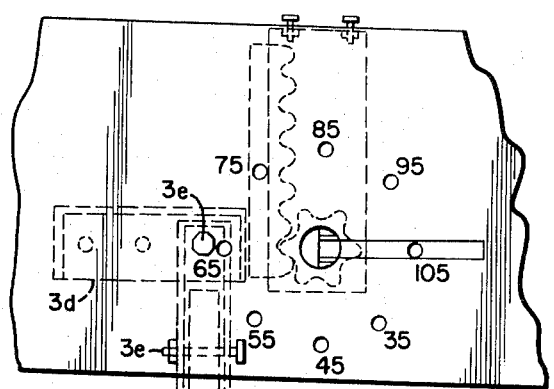
FIG. 5 is a rear view of the automobile speed governor, type B.
Figure 5:
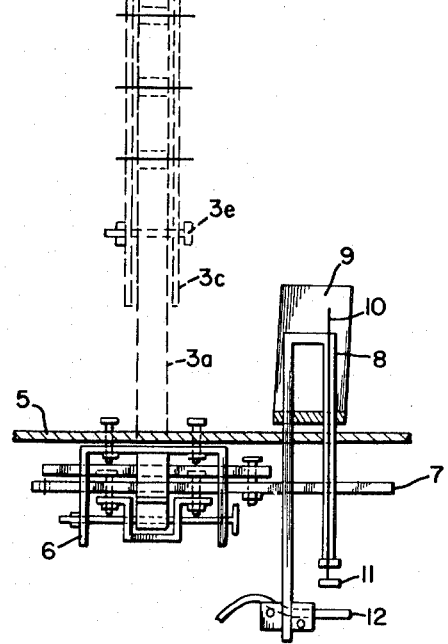

Again, we install a vertical sleeve 3c and a horizontal sleeve 3d on the upper end of the climbing tail 3a of the linkage (refer to FIG. 5). It can be moved to the right of left, up or down by loosing the securing screws 3e. After ensuring the rack 4 precisely meshes with gear 1a, the screws are tightened. This comes out as the automobile speed governor, type B which is so suitable to be easily fixed at any type, large or small of the automobile currently in use.

I claim:

1. A device for limiting the speed of a motor vehicle and mounted on the rear wall of the engine compartment comprising: an accelerator pedal stoppage located adjacent the accelerator pedal, linkage means pivotally mounted to the motor vehicle and carrying said pedal stoppage at its lower end and carrying a rack at its higher end, a pinion or gear meshing with the teeth of said rack to move the rack and linkage, a control lever rigid with said pinion, and means for holding said lever in a selected position and forming a portion of a speed control meter.

* * * * *